(No Model.)

G. R. POHL.
CIGAR CUTTER.

No. 351,886. Patented Nov. 2, 1886.

Witnesses:

Inventor:
George R. Pohl,
By T. C. Brecht
Attorney.

UNITED STATES PATENT OFFICE.

GEORGE R. POHL, OF WASHINGTON, DISTRICT OF COLUMBIA, ASSIGNOR OF ONE-HALF TO FRED. HUGLE, OF SAME PLACE.

CIGAR-CUTTER.

SPECIFICATION forming part of Letters Patent No. 351,886, dated November 2, 1886.

Application filed February 8, 1886. Serial No. 191,205. (No model.)

*To all whom it may concern:*

Be it known that I, GEORGE R. POHL, a citizen of the United States, residing at Washington, in the District of Columbia, have invented certain new and useful Improvements in Cigar-Cutters; and I do hereby declare the following to be a full, clear, and exact description of the invention, such as will enable others skilled in the art to which it appertains to make and use the same.

My invention relates to improvements in cigar-cutters; and the object of my invention is to produce a cigar-cutter by which the tips of cigars can be cut by introducing them into a machine, preferably of outline in the form of a dog or other animal and placed in a rearing position, so that the part cut off will pass through a tube extending from the front toward the rear of the machine, where it can be received in a suitable receptacle of any kind, if desired; also to produce means for operating the cutting-knife, consisting of one or more levers and other devices that will cause the levers, after being operated, to resume their normal positions.

My invention consists in the construction of certain parts and arrangement of parts, as will be more fully described hereinafter, and specifically pointed out in the claim, reference being had to the accompanying drawings and the letters of reference marked thereon.

Similar letters indicate like parts in the different figures of the drawings, in which—

Figure 1:
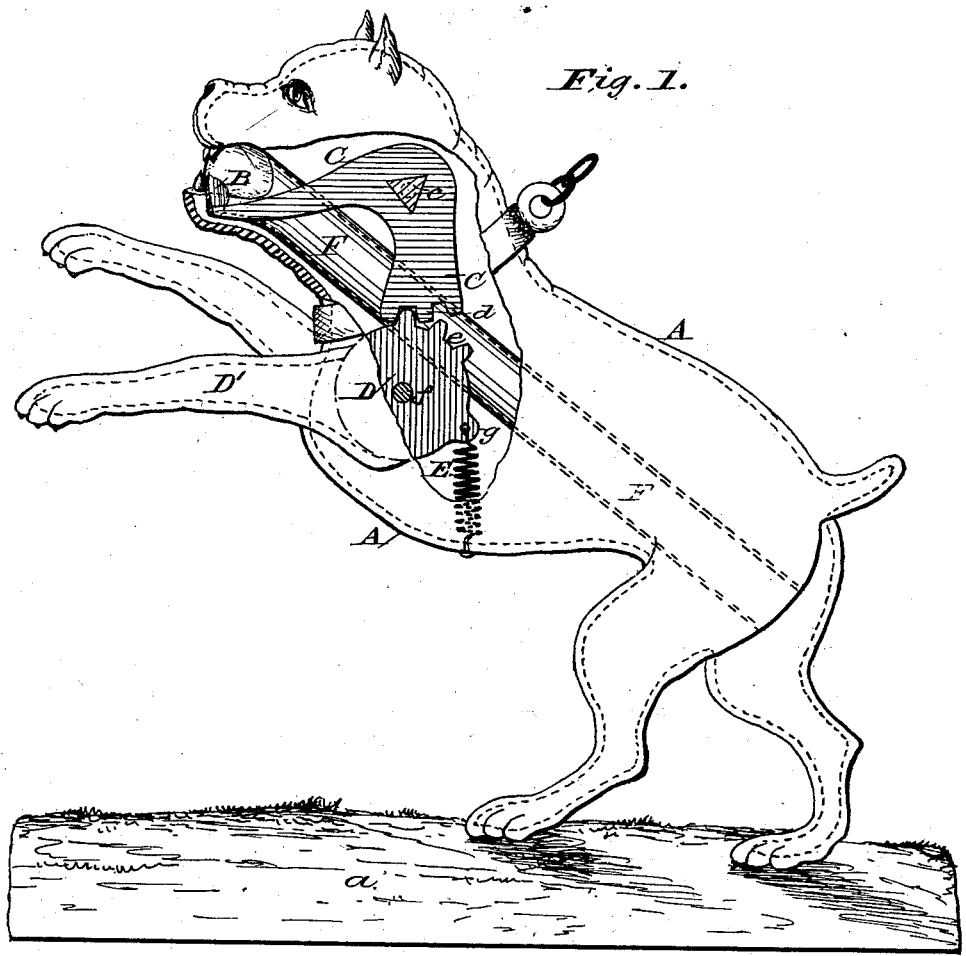
Figure 2:
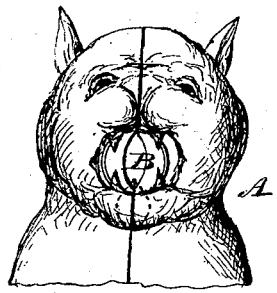
Figure 3:
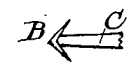

Figure 1 represents a side elevation of my improved cigar-cutter partly broken away and in section. Fig. 2 is a detached view showing the cutters. Fig. 3 is a detached view of the cutter.

In the drawings, A represents the main body or frame of the machine in the shape of a bulldog placed in a rearing position, as if about to spring upon a person, but detained. It is preferably made in two parts and secured together after the operating parts have been introduced, and it may be cast to a suitable base, $a$, or may be secured by screws or bolts to a counter or other suitable place. It is cast of malleable cast-iron, brass, composition, or other suitable metal, and instead of being in the shape of a dog, it may represent a bear, monkey, cat, tiger, or any other animal. The body is made hollow, and the cutting-knife B made preferably of triangular shape, (see Fig. 3,) and is attached to a lever, C, which is fastened to a shaft, $c$, journaled in the sides of the frame. The lever C has an angular form, and is provided with a series of teeth, $d$, that mesh or engage with teeth $e$ of a segment-wheel, D, which is secured to a shaft, $f$, journaled also in the sides of the frame. The segment-wheel D is attached to lever D', and is provided with a lug, $g$, to which a spring, E, is attached at one end, while the other end of said spring is secured to the body of the machine. The shaft $c$ of the lever C is made of triangular or square shape, to prevent said lever from revolving on the shaft, and the shaft of the segment-wheel may also be made square, if desired.

The movable cutting-knife is arranged in the lower part of the front of the machine, which may be made in the form shown in figures, and a tube, F, is arranged so as to receive the part cut out of the cigar, and the tube passes out at the rear of the machine, where a suitable receptacle of any kind may be placed to receive the cuttings. The tube is preferably arranged at an angle of about forty-five degrees, so that no particles will lodge in it. The mouth of the receiving-tube is made slightly flaring, to facilitate the entrance of the pieces of cigars cut out of the tips.

The operation is as follows: The cigars are introduced into the front of the machine, and the lever is pressed upon, when it will partly revolve the segment-wheel, which imparts an upward movement to the knife B, which then cuts a triangular piece out of the tip of the cigar. The piece of the cigar is received into the mouth of the receiving-tube, and passing through it may be caught in a suitable receptacle, placed at the rear part of the frame. The spring attached to the lug of the segment-wheel and the frame serves to return the cutting-knife and levers to their normal positions.

Having thus described my invention, what I claim, and desire to secure by Letters Patent, is—

The cigar-cutter herein described, consisting of the frame A, provided with inclined tube F, pivoted bell-crank lever C, having cutting-knife B, and teeth $d$, meshing with teeth $c$ on a segment-wheel, D, which is attached to lever D', and provided with a lug, $g$, for attachment of spring E, all arranged as and for the purpose specified.

In testimony whereof I hereby affix my signature in presence of two witnesses.

GEORGE R. POHL.

Witnesses:
F. O. MACK,
T. C. BRECHT.